US011064345B1

(12) United States Patent
Mahajan et al.

(10) Patent No.: US 11,064,345 B1
(45) Date of Patent: Jul. 13, 2021

(54) TOUCHLESS SUPPORT FOR COMMERCIAL IN-SERVICE USER EQUIPMENT IN PRIVATE MOBILE NETWORKS

(71) Applicant: NOKIA SOLUTIONS AND NETWORKS OY, Espoo (FI)

(72) Inventors: Sanjeev Mahajan, Naperville, IL (US); Harpreet Singh, Naperville, IL (US)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

(21) Appl. No.: 17/138,239

(22) Filed: Dec. 30, 2020

(30) Foreign Application Priority Data

Jan. 15, 2020 (FI) ........................................ 20205034

(51) Int. Cl.
*H04W 8/08* (2009.01)
*H04W 8/18* (2009.01)
*H04W 8/20* (2009.01)
*H04W 12/30* (2021.01)
(Continued)

(52) U.S. Cl.
CPC ............ *H04W 8/183* (2013.01); *H04W 8/20* (2013.01); *H04W 12/06* (2013.01); *H04W 12/35* (2021.01); *H04W 88/06* (2013.01)

(58) Field of Classification Search
CPC ........ H04L 63/18; H04W 8/10; H04W 92/02; H04W 12/06; H04W 84/045; H04W 68/12; H04W 4/60; H04W 8/183; H04W 12/35; H04W 8/20; H04W 88/06
See application file for complete search history.

(56) References Cited

U.S. PATENT DOCUMENTS

2007/0165579 A1\* 7/2007 Delibie ................... H04L 67/12 370/338
2013/0054763 A1\* 2/2013 Van der Merwe ........................... H04L 63/0272 709/220

FOREIGN PATENT DOCUMENTS

| EP | 2731382 A2 | 5/2014 |
| EP | 2938106 A1 | 10/2015 |
| GB | 2517814 A | 3/2015 |

OTHER PUBLICATIONS

Finnish Search Report dated May 11, 2020 corresponding to Finnish Patent Application No. 20205034.
(Continued)

*Primary Examiner* — Gary Lafontant
(74) *Attorney, Agent, or Firm* — Squire Patton Boggs (US) LLP

(57) ABSTRACT

According an aspect, there is provided a terminal device for performing the following. The terminal device transmits a request for authorizing a user of the terminal device for accessing a private mobile network to a server system managing the private mobile network. The request comprises at least identification information identifying the user. In response to receiving a confirmation message confirming an authorization of the user for accessing the private mobile from the server system, the terminal device adds, to a list of allowed mobile networks in at least one memory, an identifier of the private mobile network and transmits one or more identifiers for a Subscriber Identity Module card of the user and one or more identifiers for the terminal device to the server system. The terminal device accesses the private mobile network using at least the identifier of the private mobile network via an access node.

18 Claims, 8 Drawing Sheets

(51) Int. Cl.
*H04W 12/06* (2021.01)
*H04W 88/06* (2009.01)

(56) References Cited

OTHER PUBLICATIONS

3GPP TS 31.121 V15.6.0 (Dec. 2019), Technical Specification, 3rd Generation Partnership Project; Technical Specification Group Core Network and Terminals; UICC-terminal interface; Universal Subscriber Identity Module (USIM) application test specification (Release 15), Dec. 2019.
Office Action dated May 11, 2020 corresponding to Finnish Patent Application No. 20205034.
Communication of Acceptance under section 29a of Patents Decree dated Sep. 3, 2020 corresponding to Finnish Patent Application No. 20205034.

Extended European Search Report dated Apr. 9, 2021 corresponding to European Patent Application No. 20205406.0.
Nokia et al: "Solution for UE Onboarding and provisioning for an SNPN," 3GPP Draft; S2-2000667, SA WG2 Meeting #S2-136-AH, Jan. 13-17, 2020, Incheon, Korea, Jan. 7, 2020, XP051842724.
Oppo: "Solution for remote provisioning for PNI-NPN UE with PLMN subscription," 3GPP Draft; S2-2000318, SA WG2 Meeting #136, Incheon Korea, Jan. 7, 2020, XP051842390.
3GPP TR 23.700-07 V0.2.0 (Dec. 2019), Technical Report, 3rd Generation Partnership Project; Technical Specification Group Services and System Aspects; Study on enhanced support of Non-Public Networks (Release 17), Dec. 4, 2019, pp. 1-15, XP051840693.
3GPP TR 33.819 V16.0.0 (Dec. 2019), Technical Report, 3rd Generation Partnership Project; Technical Specification Group Services and System Aspects; Study on Security enhancements of 5G System (5GS) for vertical and Local Area Network (LAN) services; (Release 16), Dec. 31, 2019, p. 1-46, XP051841010.

* cited by examiner

TOUCHLESS SUPPORT FOR COMMERCIAL IN-SERVICE USER EQUIPMENT IN PRIVATE MOBILE NETWORKS

TECHNICAL FIELD

Various example embodiments relate to wireless communications.

BACKGROUND

A private LTE network is a standards-based LTE network that is deployed, for example, by a company or a governmental agency to provide networking on its premises. Typically, private LTE Networks are not deployed in the spectrum licensed to commercial operators and are controlled by deploying agencies. A major challenge for private LTE deployments is to provide support for commercial operator handsets on their network. The general assumption is that private LTE network operator will issue new SIM cards or handsets that are provisioned for use in the private LTE network only. While this may be a suitable solution for some Internet of Things (IoT) devices, it is inconvenient, for example, for users of smart phones as they have to either carry around multiple devices or be constantly changing Subscriber Identity Module (SIM) cards in their devices.

GB 2517814 A discloses a method of obtaining authentication information necessary to authenticate a mobile device connected to a mobile communication network. The method enables easier migration between mobile communication network operators for subscribers (e.g., enabling migration without requiring the user to change a SIM card).

3GPP TS 31.121 V15.6.0 (2019-12), 3rd Generation Partnership Project; Technical Specification Group Core Network and Terminal; UICC-terminal interface; Universal Subscriber Identity Module (USIM) application test specification (Release 15), 2020-01-08; Section 7.2 discloses a procedure for user con-trolled public land mobile network (PLMN) selector handling.

BRIEF DESCRIPTION

According to an aspect, there is provided the subject matter of the independent claims. Embodiments are defined in the dependent claims. The scope of protection sought for various embodiments of the invention is set out by the independent claims.

The embodiments and features, if any, described in this specification that do not fall under the scope of the independent claims are to be interpreted as examples useful for understanding various embodiments of the invention.

BRIEF DESCRIPTION OF DRAWINGS

In the following, example embodiments will be described in greater detail with reference to the attached drawings, in which.

DETAILED DESCRIPTION OF SOME EMBODIMENTS

In the following, different exemplifying embodiments will be described using, as an example of an access architecture to which the embodiments may be applied, a radio access architecture based on long term evolution advanced (LTE Advanced, LTE-A) or new radio (NR, 5G), without restricting the embodiments to such an architecture, however. The embodiments may also be applied to other kinds of communications networks having suitable means by adjusting parameters and procedures appropriately. Some examples of other options for suitable systems are the universal mobile telecommunications system (UMTS) radio access network (UTRAN or E-UTRAN), long term evolution (LTE, the same as E-UTRA), wireless local area network (WLAN or WiFi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof.

Figure 1:
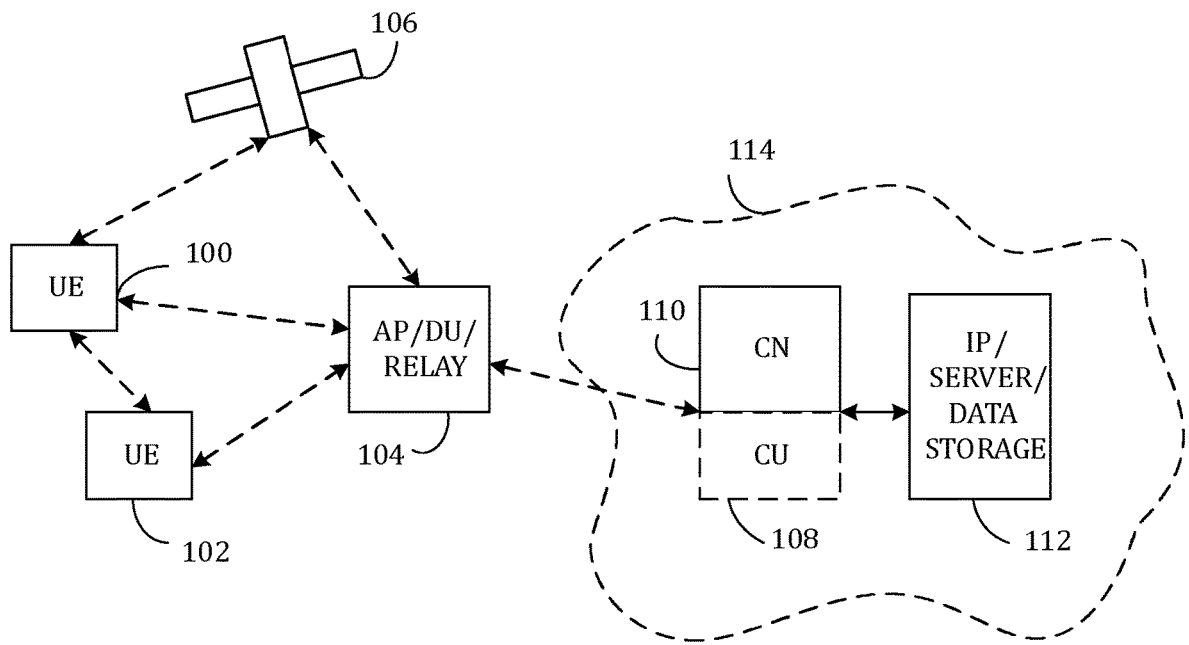
FIG. 1 illustrates an exemplified wireless communication system.

FIG. 1 depicts examples of simplified system architectures only showing some elements and functional entities, all being logical units, whose implementation may differ from what is shown. The connections shown in FIG. 1 are logical connections; the actual physical connections may be different. It is apparent to a person skilled in the art that the system typically comprises also other functions and structures than those shown in FIG. 1.

The embodiments are not, however, restricted to the system given as an example but a person skilled in the art may apply the solution to other communication systems provided with necessary properties.

The example of FIG. 1 shows a part of an exemplifying radio access network.

FIG. 1 shows devices 100 and 102. The devices 100 and 102 may, for example, be user devices. The devices 100 and 102 are configured to be in a wireless connection on one or more communication channels with a node 104. The node 104 is further connected to a core network 110. In one example, the node 104 may be an access node such as (e/g)NodeB providing or serving devices in a cell. In one example, the node 104 may be a non-3GPP access node. The physical link from a device to a (e/g)NodeB is called uplink or reverse link and the physical link from the (e/g)NodeB to the device is called downlink or forward link. It should be appreciated that (e/g)NodeBs or their functionalities may be implemented by using any node, host, server or access point etc. entity suitable for such a usage.

A communications system typically comprises more than one (e/g)NodeB in which case the (e/g)NodeBs may also be configured to communicate with one another over links, wired or wireless, designed for the purpose. These links may be used for signalling purposes. The (e/g)NodeB is a computing device configured to control the radio resources of communication system it is coupled to. The NodeB may also be referred to as a base station, an access point or any other type of interfacing device including a relay station capable of operating in a wireless environment. The (e/g)NodeB includes or is coupled to transceivers. From the transceivers of the (e/g)NodeB, a connection is provided to an antenna unit that establishes bi-directional radio links to devices. The antenna unit may comprise a plurality of antennas or antenna elements. The (e/g)NodeB is further connected to the core network 110 (CN or next generation core NGC). Depending on the system, the counterpart on the CN side can be a serving gateway (S-GW, routing and forwarding user data packets), packet data network gateway (P-GW), for providing connectivity of devices (UEs) to external packet data networks, or mobile management entity (MME), etc.

The device (also called user device, UE, user equipment, user terminal, terminal device, etc.) illustrates one type of an apparatus to which resources on the air interface are allocated and assigned, and thus any feature described herein with a device may be implemented with a corresponding apparatus, such as a relay node. An example of such a relay node is a layer 3 relay (self-backhauling relay) towards the base station.

The device typically refers to a device (e.g. a portable or non-portable computing device) that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a device may also be a nearly exclusive uplink only device, of which an example is a camera or video camera loading images or video clips to a network. A device may also be a device having capability to operate in Internet of Things (loT) network which is a scenario in which objects are provided with the ability to transfer data over a network without requiring human-to-human or human-to-computer interaction, e.g. to be used in smart power grids and connected vehicles. The device may also utilise cloud. In some applications, a device may comprise a user portable device with radio parts (such as a watch, earphones or eyeglasses) and the computation is carried out in the cloud. The device (or in some embodiments a layer 3 relay node) is configured to perform one or more of user equipment functionalities. The device may also be called a subscriber unit, mobile station, remote terminal, access terminal, user terminal or user equipment (UE) just to mention but a few names or apparatuses.

In 5G, the device 100, 102 (or specifically the UE hardware) may be associated with a unique identifier called the permanent equipment identifier (PEI). A UE 100, 102 may make use of a cellular network's services via a subscription. A subscription may be bounded to a physical a universal subscriber identity module (USIM) card and may be identified by a unique subscription permanent identifier (SUPI). SUPI may consist of the mobile country code (MCC), mobile network code (MNC), and the mobile subscription identification number (MSIN). In the following embodiments, PEI and SUPI may correspond to (i.e., have the same format as) international mobile equipment identifier (IMEI) and international mobile subscriber identity (IMSI), respectively. In any of the following embodiments, PEI may be used instead of IMEI and/or SUPI may be used instead of IMSI.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented.

5G enables using multiple input-multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications (such as (massive) machine-type communications (mMTC), including vehicular safety, different sensors and real-time control. 5G is expected to have multiple radio interfaces, namely below 6 GHz, cmWave and mmWave, and also being integrable with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz-cmWave, below 6 GHz-cmWave-mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The current architecture in LTE networks is fully distributed in the radio and fully centralized in the core network. The low latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks, such as a public switched telephone network or the Internet 112, or utilize services provided by them. The communication network may also be able to support the usage of cloud services, for example at least part of core network operations may be carried out as a cloud service (this is depicted in FIG. 1 by "cloud" 114). The communication system may also comprise a central control entity, or a like, providing facilities for networks of different operators to cooperate for example in spectrum sharing.

The technology of Edge cloud may be brought into a radio access network (RAN) by utilizing network function virtualization (NVF) and software defined networking (SDN). Using the technology of edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloudRAN architecture enables RAN real time functions being carried out at the RAN side (in a distributed unit, DU 104) and non-real time functions being carried out in a centralized manner (in a centralized unit, CU 108).

It should also be understood that the distribution of labour between core network operations and base station operations may differ from that of the LTE or even be non-existent. Some other technology advancements probably to be used are Big Data and all-IP, which may change the way networks are being constructed and managed. 5G (or new radio, NR) networks are being designed to support multiple hierarchies, where MEC servers can be placed between the core and the base station or nodeB (gNB). It should be appreciated that MEC can be applied in 4G networks as well.

5G may also utilize satellite communication to enhance or complement the coverage of 5G service, for example by providing backhauling. Possible use cases are providing service continuity for machine-to-machine (M2M) or Internet of Things (loT) devices or for passengers on board of vehicles, or ensuring service availability for critical communications, and future railway/maritime/aeronautical communications. Satellite communication may utilise geostationary earth orbit (GEO) satellite systems, but also low earth orbit (LEO) satellite systems, in particular mega-constellations (systems in which hundreds of (nano)satellites are deployed). Each satellite 106 in the mega-constellation may cover several satellite-enabled network entities that create on-ground cells. The on-ground cells may be created through an on-ground relay node 104 or by a gNB located on-ground or in a satellite.

It is obvious for a person skilled in the art that the depicted system is only an example of a part of a radio access system and in practice, the system may comprise a plurality of (e/g)NodeBs, the device may have an access to a plurality of radio cells and the system may comprise also other apparatuses, such as physical layer relay nodes or other network elements, etc. At least one of the (e/g)NodeBs or may be a Home(e/g)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g)NodeBs of FIG. 1 may provide any kind of these cells. A cellular radio system may be implemented as a multilayer network including several kinds of cells. Typically, in multilayer networks, one access node provides one kind of a cell or cells, and thus a plurality of (e/g)NodeBs are required to provide such a network structure.

For fulfilling the need for improving the deployment and performance of communication systems, the concept of "plug-and-play" (e/g)NodeBs has been introduced. Typically, a network which is able to use "plug-and-play" (e/g)Node Bs, includes, in addition to Home (e/g)NodeBs (H(e/g)nodeBs), a home node B gateway, or HNB-GW (not shown in FIG. 1). A HNB Gateway (HNB-GW), which is typically installed within an operator's network may aggregate traffic from a large number of HNBs back to a core network.

Embodiments to be discussed may be applied specifically to private LTE networks. Private LTE networks are standards-based LTE networks that are deployed, for example, by a company or a governmental agency to provide networking on its premises. Typically, private LTE Networks are not deployed in the spectrum licensed to commercial operators and are controlled by the deploying agencies. In other words, they are independent of the mobile networks of commercial service providers or operators. A major challenge for private LTE deployments is to provide support for terminal devices of commercial operators on the private LTE networks. The general assumption is that private LTE network operator will issue new SIMs or handsets that are provisioned for use in the private LTE network only. While this may be a suitable solution for some Internet of Things (loT) devices, it is inconvenient, for example, for users of smart phones as they have to either carry around multiple devices or be constantly changing SIM cards in their devices. The main problem areas in using a terminal device of a commercial operator in a private LTE network are:

authorizing the terminal device and/or subscriber to access a private LTE Network, selecting private LTE public land mobile network (PLMN) system by a terminal device of a commercial operator, provisioning of the private LTE Core to allow access for the authorized personnel on the private LTE network and authentication and encryption using the authentication data of a commercial operator without a roaming agreement.

The embodiments seek to overcome or at least alleviate the aforementioned problems.

Commercial mobile networks as discussed in this application may be equally called public mobile networks.

Figure 2:
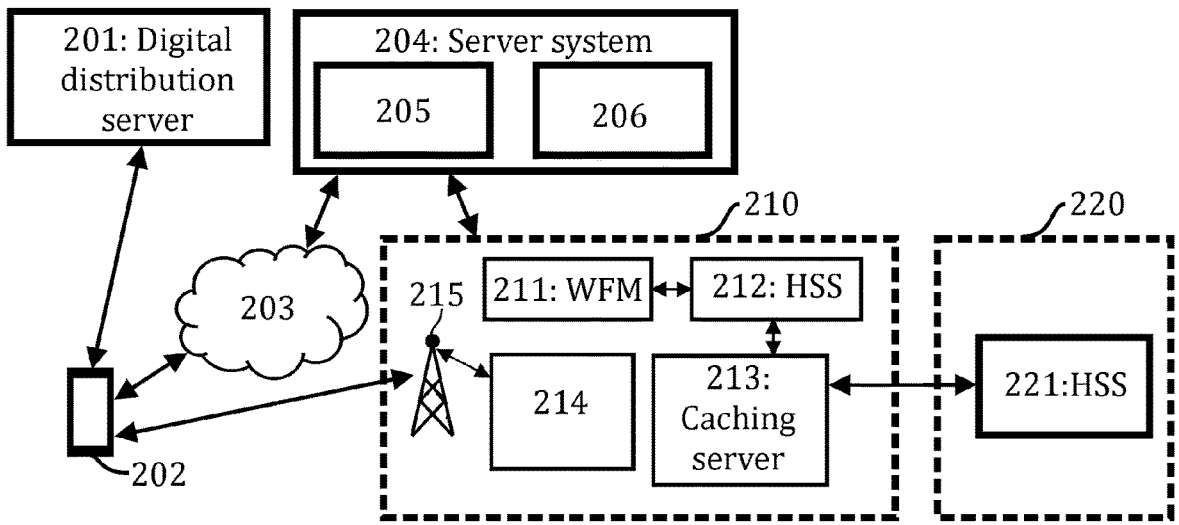
FIG. 2 illustrates a system architecture according to embodiments.

FIG. 2 illustrates a system according to embodiments. In the following properties and functionalities of the elements in FIG. 2 are described in brief with more detailed description being provided below in relation to flow charts and signaling diagrams of FIGS. 3 to 7. The system of FIG. 2 may correspond to a more detailed view of some aspects of the system of FIG. 1.

Referring to FIG. 2, the illustrated system comprises a digital distribution server 201, a terminal device 202, a private mobile network 210, a server system 204 for managing the private mobile network 210 and a (commercial) mobile network 220.

The digital distribution server 201 is a server maintaining, in a database, an application according to embodiments for enabling a terminal device to access a private mobile network. The application maintained in the database may be downloaded using the terminal device 202 and subsequently installed on the terminal device 202. The operation of the terminal device 202 when running the application is discussed in detail below. The digital distribution server 201 may be a server of a digital distribution platform. The digital distribution server 201 may be an Internet server. In some embodiments, the digital distribution server 201 may be omitted (e.g., the application may pre-installed to the terminal device 202 or installed using other means).

The terminal device 202 may be a terminal device (equally called user equipment) as defined in relation to FIG. 1. It may be assumed, here, that the terminal device 202 comprises at least one SIM (i.e., at least one SIM card). The term "SIM" or "SIM card" may be interpreted broadly in connection with embodiments so as to comprise not only conventional GSM SIM cards but also any further developments of the concept with additional functionalities. The term "SIM" or "SIM card" may correspond to a universal integrated circuit card (UICC). The UICC may be defined as a smart card comprising a central processing unit (CPU), read-only memory (ROM), random access memory (RAM), electrically erasable programmable read-only memory (EEPROM) and input/output (I/O) circuits. Specifically, said UICC according to embodiments may comprise at least a universal subscriber identity module (USIM) application (and optionally one or more further applications, e.g., a SIM application). Such SIM cards are sometimes called USIM cards.

The terminal device 202 may be specifically a terminal device of a commercial operator, i.e., a commercial (in-service) terminal device. In other words, the terminal device may not be a terminal device equipped with a dedicated SIM card solely for operating in the private mobile network. Each of said at least one SIM card of the terminal device may be capable of operation in commercial mobile networks (commercial PLMNs) and, according to embodiments to be discussed below, also in private mobile networks (private PLMNs).

The terminal device 202 is connected wirelessly to the digital distribution server 201 and to the server system 204. The connection to the digital distribution server 201 may be provided, for example, via a wireless local area network or via a radio access network (not shown). The connection to the server system 204 may be provided via a wireless communications network 203. Upon running the application downloaded and installed from the digital distribution server 201 to completion according to embodiments, the terminal device may also be able to connect wirelessly to the private mobile network 210 via an access node 215.

In some more general embodiments, the element 203 may correspond to communication means. Said communication means 203 may comprise wired and/or wireless communication means. Said communication means 203 may comprise one or more of a wireless communications network, a wireless communications link, a wired communications network and a wired communications link. Further, said communication means 203 may comprise one or more of a wireless local area network (WLAN), a WiFi network, a Bluetooth communication link, Near Field Communication (NFC) link, a Visible Light Communication (VLC) link, a ZigBee communication link, mobile ad-hoc networks (MANETs), a radio access network (RAN) and the Internet. In the following discussion of different embodiments, the communication means 203 are assumed to correspond to a wireless communications network merely as an example.

The server system 204 comprises one or more servers 205, 206 for managing the private mobile network 210. Said one or more servers may comprise one or more cloud servers (i.e., one or more servers implemented in one or more public computing clouds and/or in one or more private computing clouds) or one or more physical servers. The server system 204 may be equally called an enterprise system, an IT system or a computing system.

The server system 204 may comprise at least a user management server 205 and a database server 206 such as a corporate active directory server. The user management server 205 may be configured to perform authentication and validation for the user of the terminal device 202 and to initiate network provisioning workflow to provision the user of the terminal device 202 in the private mobile network. The database server 206 may maintain, in a database, identification information on a plurality of users associated with the server system. The identification information may comprise, for each user, for example, one or more identifiers (e.g., numeric and/or alphanumeric identifiers), an e-mail, a name, an address, a date of birth and/or a password. For example, the server system 204 may be a server system of a company, a governmental agency or an organization and the database server may maintain, in the database, identification information for a plurality of employees of said company or governmental agency or for a plurality of members of said organization. In some alternative embodiments, the functionalities of the user management server 205 and the database server 206 may be implemented in a single server.

The private mobile network 210 comprises at least a work flow management unit 211, a home subscriber server (HSS) 212, a caching server 213, a core network 214 and one or more access nodes 215. The private mobile network may be a private LTE network, that is, a standards-based LTE network deployed by an entity such as by a company or a governmental agency. The private mobile network may be treated, from the point of view of the terminal device, as a private public land mobile network (private PLMN).

The workflow management unit 211 (or equally called a workflow management entity or node or simply a workflow manager) may be configured to manage the subscribers of the private mobile network 210. For example, the work flow management unit 211 may add, delete and/or update subscribers by communicating with the HSS 212. It will initiate the network provisioning workflow to provision the user in the private mobile network. This would include adding a subscriber or deleting a subscriber once the authorization period expires or updating the subscriber record if they change the UE device. The work flow management unit 211 may comprise a first signaling interface for communicating with the server system 204 and a second signaling interface for communicating with the HSS 212.

The home subscriber server (HSS) 212 is a subscriber database used within the IP Multimedia Subsystem (IMS) and Evolved Packet Core (EPC). The HSS provides information on the subscribers to other entities within the private mobile network 210. The IMS enables users to be granted or refused access to other services dependent on their status. The HSS 212 may be a conventional HSS of a LTE network. The HSS 212 may comprise a first signaling interface for communicating with the work flow management unit 211 and a second signaling interface for communicating with the caching server 213.

The caching server 213 acts as a proxy of a HSS 221 (or an authentication center, AuC, therein) of a commercial mobile network 220. The caching server 213 may be deployed in the private mobile network 210 as a separate server or as an extension of the HSS 212 (not shown in FIG. 2). The caching server 213 may be configured to request authentication data of a user from a home subscriber server 221 of commercial mobile network 220 and subsequently, upon receiving the authentication data, cache the received authentication data for enabling the terminal device 202 to access the private mobile network 210.

The element 214 indicates core network functionalities of the private mobile network 210. The element 214 may comprise, for example, an EPC core, an IMS core, a policy and charging rules function (PCRF) and/or a voice mail system.

The one or more access nodes 215 providing radio access to the private mobile network 210 may be defined as described in relation to element 104 of FIG. 1.

The mobile network 220 (or a cellular network or a PLMN) may comprise any elements conventionally comprised in a mobile network even though only the HSS 221 is shown explicitly in FIG. 2 (being the element most closely connected to embodiments). The mobile network 220 may specifically be a commercial home mobile network or a home public mobile network of the terminal device 202. The mobile network 220 may be a LTE network or specifically a LTE PLMN. The HSS 221 of the mobile network 220 may be a conventional HSS of a mobile network configured to, upon receiving a corresponding request, to provide authentication data (e.g., at least one authentication vector) to the requester (i.e., here the caching server 213).

Figure 3:
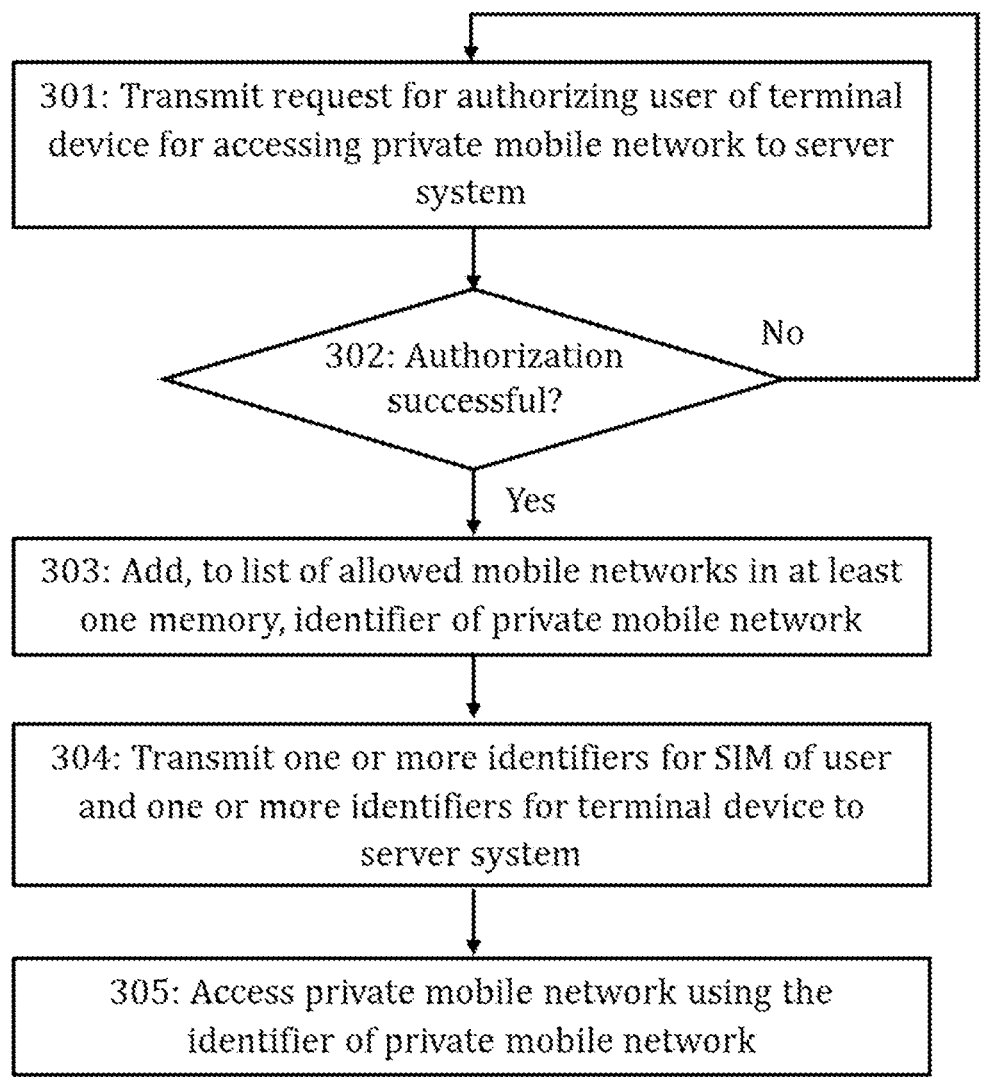
FIGS. 3 to 7 illustrate exemplary processes according to embodiments.

FIG. 3 illustrates a process according to embodiments for acquiring access to a private mobile network by a terminal device. The process of FIG. 3 may be carried out by a terminal device or more specifically by either of the terminal devices 100, 102 of FIG. 1 and/or the terminal device 202 of FIG. 2. The terminal device carrying out the process may comprise at least one SIM card (as discussed in relation to element 202 of FIG. 2).

In FIG. 3, it may be initially assumed that the terminal device carrying out the process has a dedicated application installed to it and the process is carried out specifically using (or at least with the aid of) said dedicated application. The installation of the application is discussed in further detail in relation to FIG. 6.

Referring to FIG. 3, the terminal device transmits, in block 301, a request for authorizing a user of the terminal device for accessing a private mobile network (via a wireless communication network) to a server system managing the private mobile network. Said request may comprise at least identification information identifying the user of the terminal device. Said identification information may comprise, for example, an identifier (e.g., a numeric or an alphanumeric identifier) of the user, a username of the user, a password of the user and/or an e-mail of the user. The identification information may be checked, by the server system, against at least one database associated with the private mobile network. For example, it may be checked, by the server system, whether the user of the terminal device is employed at a company owning the private mobile network by checking the identification information against a corporate active directory and/or whether the user of the terminal device has been granted permission for accessing this particular private mobile network by checking the identification information against a dedicated database maintaining information on such permissions (i.e., maintaining information on authorized users of the private mobile network).

In some embodiments, two or more requests may be transmitted. In such embodiments, said two or more requests may trigger checking of the identification information against different databases. Moreover, said two or more requests may be transmitted to different entities or units or servers within the server systems (e.g., to a user management server and to a database server). The authorization functionalities according to such embodiments are discussed in more detail in relation to FIG. 6.

In response to receiving a confirmation message confirming that an authorization of the user for accessing the private mobile network was successful (via the wireless communications network) from the server system in block 302, the terminal device adds, in block 303, to a list of allowed mobile networks maintained in at least one memory of the terminal device (or specifically of the SIM card inserted into the terminal device), an identifier of the private mobile network. The identifier of the private mobile network may be received in the confirmation message in block 302. Optionally, other information on the private mobile network may also be added to said list or stored elsewhere. Specifically, the terminal device may update, in block 303, a user controlled PLMN selector with access technology (EFPLMNwACT) list (having an identifier 6F60), maintained in a memory of the SIM card (or the USIM card), with an identifier of the private mobile network (being, e.g., a private LTE PLMN). It should be noted that as the owner of the private mobile network (i.e., a company, an agency or an organization) may have multiple private mobile networks, the private mobile network (or PLMN) added to the EFPLMNwACT file is, here, specifically the one determined for the request of block 301.

Also in response to the receiving in block 302, the terminal device transmits, in block 304, one or more identifiers for a subscriber identity module (SIM) card of the user comprised in the terminal device and one or more identifiers for the terminal device (via the wireless communications network) to the server system for provisioning the user in the private mobile network using transmitted identifiers (i.e., for enable provisioning of a core network of the private mobile network to allow access for the user). Said SIM card may be assumed to be provisioned, initially (i.e., before carrying out the process of FIG. 3 for any private network), for use only in one or more public (or commercial) mobile networks. In general, said SIM card may be assumed to be provisioned for use in a public mobile network (being the home public mobile network of the user) and optionally a second private mobile network (i.e., a private mobile network other than said private mobile network). Said one or more identifiers for the terminal device (i.e., one or more identifiers for the terminal device excluding the SIM card) may comprise, for example, an international mobile equipment identity (IMEI). Said one or more identifiers for a SIM card of the user may comprise, for example, a mobile station international integrated services digital network number (MSISDN), an integrated circuit card identifier (ICCID) and/or an international mobile subscriber identity (IMSI). In some embodiments, said one or more identifiers for the terminal device may comprise, additionally or alternatively, a permanent equipment identifier (PEI) and/or said one or more identifiers for a SIM card of the user may comprise, additionally or alternatively, a subscription permanent identifier (SUPI).

The identifiers may be transmitted, in block 304, specifically to a user management server of the server system.

In embodiments where two or more requests are transmitted, separate confirmation messages may be transmitted after each of said one or more requests has been processed successfully and subsequently received. In some embodiments where a first request and a second request are transmitted, the second request may be transmitted only after a confirmation has been received regarding the first request, as will be discussed in relation to FIG. 6.

The terminal device accesses, in block 305, the private mobile network using at least the identifier of the private mobile network via an access node of the private mobile network. The initial attempt to access the private mobile network may trigger an authentication data retrieval and caching procedure in the core network of the private mobile network so as to enable the access. This process will be described in detail in relation to FIGS. 5 and 7.

Figure 4:
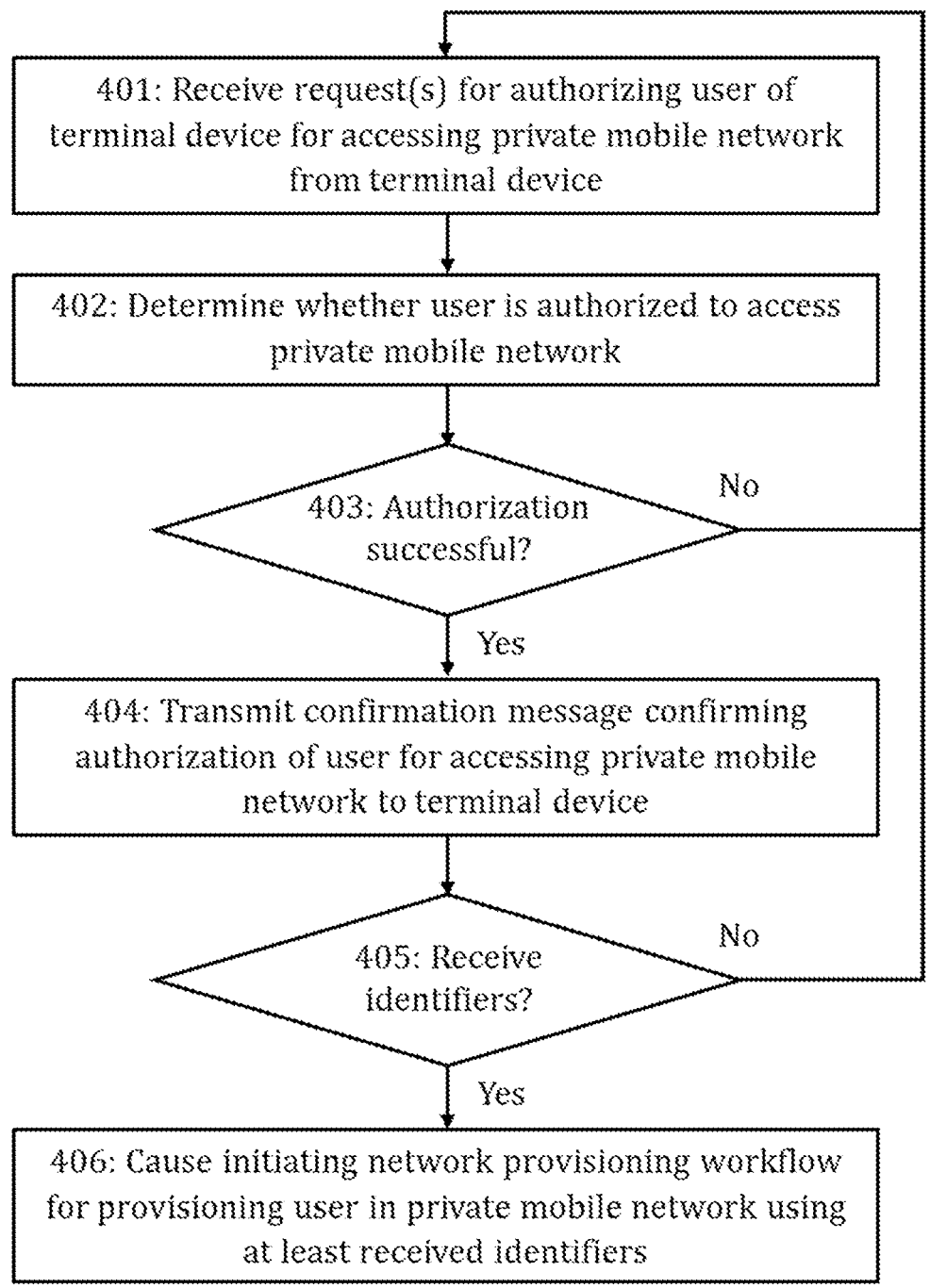

FIG. 4 illustrates a process according to embodiments for authorizing a terminal device to access to a private mobile network and causing provisioning the user in the private mobile network. The process of FIG. 4 may be carried out by a server system or more specifically by the server system 204 of FIG. 2. The server system carrying out the process may comprise one or more servers comprising, for example, a user management server and/or a database server.

Referring to FIG. 4, the server system receives, in block 401, a request for authorizing a user of the terminal device for accessing a private mobile network (via a wireless communication network) from a terminal device. The request may comprise at least identification information identifying the user of the terminal device (which may comprise, e.g., at least an IMSI of the SIM card of the user). In general, said request may be defined as described in relation to block 301 of FIG. 3.

In response to the receiving in block 401, the server system determines, in block 402, whether the user is authorized for accessing the private mobile network by comparing the identification information of the user against identification information of authorized users maintained in at least one database (e.g., in a database of a user management server). For example, the server system may compare a received IMSI of the SIM card of the user to IMSIs of a plurality of SIM cards of a plurality of user maintained in said at least one database. If multiple databases are checked, all of said databases (or in some embodiments, one or more of said databases) may need to contain a match for the identification information of the user. As described in relation to FIG. 3 and as will be described in detail in relation to FIG. 6, in some embodiments multiple requests may be received from the same terminal device, each of which triggers checking the user against a different database (or a part thereof).

In response to the authorization being successful in block 403, the server system transmits, in block 404, a confirmation message confirming an authorization of the user for accessing the private mobile network (via the wireless communications network) to the terminal device. As described in detail in relation to block 304 of FIG. 3, in response to receiving the confirmation message, the terminal device transmits one or more identifiers for a SIM card of the user comprised in the terminal device (and being provisioned for use, at least initially, in a public mobile network) and one or more identifiers for the terminal device itself (via the wireless communications network) to the server system. In response to receiving these identifiers in block 405, the server system causes, in block 406, initiating network provisioning workflow for provisioning the user in the private mobile network using at least the received identifiers. Specifically, the server system transmits, in block 406, at least the received identifiers to a workflow management unit of the private mobile network (or specifically of the core network of the private mobile network). In other embodiments, the received identifiers may be transmitted, in block 406, to a core network element of the private mobile network other than a workflow management unit. The provisioning results in the user being added as a subscriber record to a HSS of the private mobile network (i.e., a HSS managed by a private mobile network operator). This will eliminate the need to have a roaming agreement with a commercial operator for enabling to the user to access the private mobile network.

Figure 5:
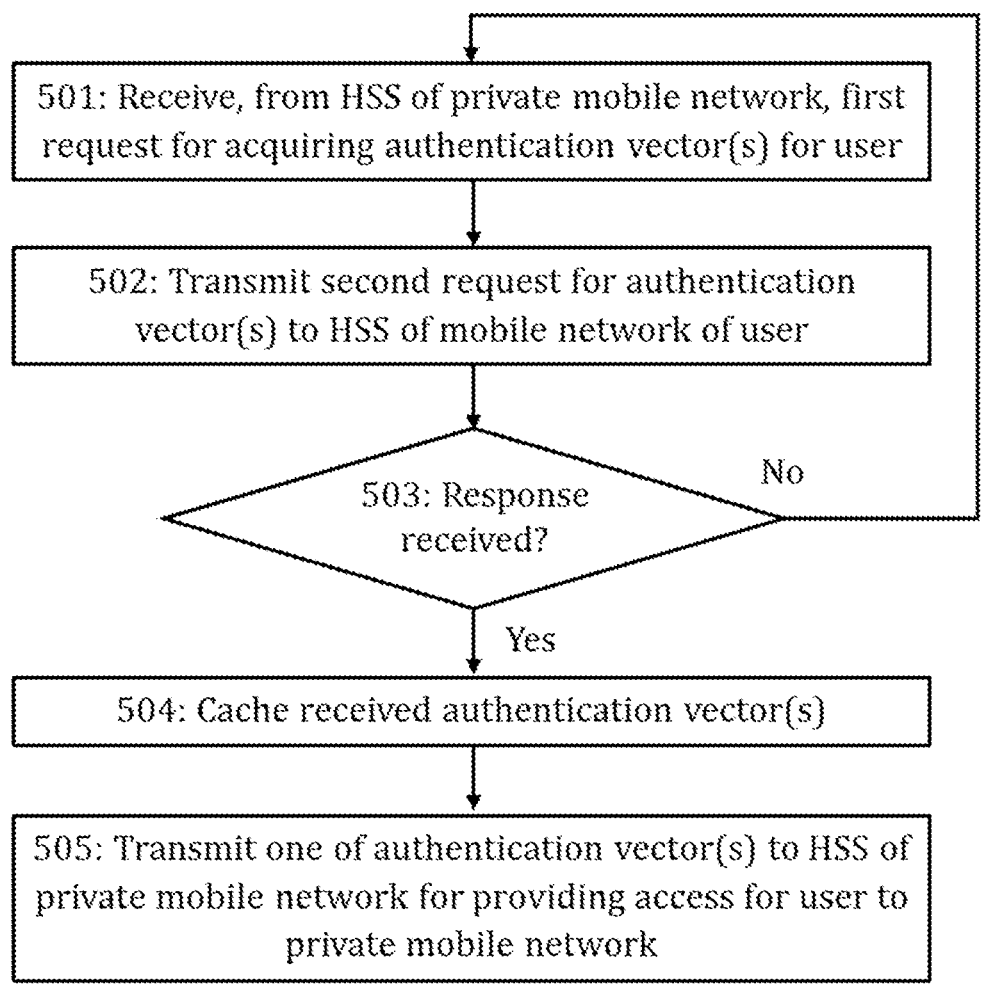

FIG. 5 illustrates a process according to embodiments for enabling a terminal device to access to a private mobile network. The process of FIG. 5 may be carried out by a caching server for a private mobile network or more specifically by the caching server 213 of FIG. 2. The caching server carrying out the process may be a proprietary caching server. The caching server carrying out the process may be a separate server or a part (or an extension) of the HSS of the private mobile network. The process of FIG. 5 may be carried out following the execution of processes of FIGS. 3 and 4 (by a terminal device and a server system, respectively) and adding a user to a HSS of the private mobile network as a subscriber record (see blocks 615 to 617 of FIG. 6).

Referring to FIG. 5, the process is initiated by the caching server receiving, in block 501, from a home subscriber server of the private mobile network, a first request for acquiring authentication data (e.g., one or more authentication vectors, preferably a plurality of authentication vectors) for a user. The first request comprises at least one or more identifiers for a SIM card of the user and/or one or more identifiers for the terminal device of the user. In an embodiment, the first request comprises at least an IMSI of the SIM card of the user. The HSS may have triggered the transmission of the first request in response to detecting that the user of the terminal device is attempting to access the private mobile network for the first time. Providing this access requires, first, acquiring the authentication data for the user. Specifically, since a HSS (or specifically the AuC therein) of a private mobile network is unable to generate authentication data for the terminal devices of commercial operators, the HSS needs to use the caching server to request authentication data from a commercial (public) mobile network associated with the user, i.e., a home (public) mobile network of the user.

Accordingly, the caching server transmits, in block 502, in response to the receiving in block 501, a second request for the authentication data of the user to a HSS of a (commercial) home mobile network of the user. The home (public) mobile network (or home PLMN) of the user may be determined based on the IMSI of the SIM card of the user. The second request comprises at least one or more identifiers for a SIM card of the user and/or one or more identifiers for the terminal device of the user. In an embodiment, the second request comprises at least an IMSI of the SIM card of the user. Based on said second request, the caching server is able to generate authentication data for the user. The generated authentication data may specifically correspond to a set of one or more authentication vectors (equally called an authentication vector array). Preferably, the set of one or more authentication vectors comprises a plurality of authentication vectors (for the same user). Each authentication vector may comprise a random number (RAND) acting as a user authentication challenge, a network authentication token ($AUTN_{HSS}$), a subscriber authentication key ($K_{ASME}$) and an expected response (XRES). The set of one or more authentication vectors may be generated based at least on the IMSI comprised in the second request, one or more cryptographic functions and a key derivation function (for acquiring $K_{ASME}$). Each of the random number (RAND), the network authentication token ($AUTN_{HSS}$), the subscriber authentication key ($K_{ASME}$) and the expected response (XRES) (or at least some of them) may have a different value in each authentication vector in the set of one or more authentication vectors. A more detailed example of how each authentication vector may be generated is discussed in relation to block 705 of FIG. 7.

In response to receiving a response comprising the authentication data (e.g., a set of one or more authentication vectors) from the HSS of the mobile network in block 503, the caching server caches, in block 504, the authentication data and transmits, in block 505, at least some of the authentication data (e.g., an authentication vector, or in general at least one authentication vector, from the set of one or more authentication vectors) to the HSS of the private mobile network for authenticating the user and thus providing access for the user to the private mobile network. In general, the authentication data may be used for providing authentication data to the HSS of the private mobile network. Subsequently, the HSS of the private mobile network is able to use the authentication data (i.e., authentication vectors in the set not yet used for authentication) in responding to authentication data requests received from a visitor location register (VLR) (or from some other core network entity or node). Specifically, the one or more authentication vectors in the set received in block 503 may be used one-by-one by the caching server whenever there is a need for authenticating the user.

In some embodiments, the caching server receives, in block 501, from the HSS of the private mobile network, a first request for acquiring authentication data for a plurality of users. In such embodiments, the first request comprises, for each of the plurality of users, at least one or more identifiers for a SIM card of the user (e.g., at least an IMSI) and/or one or more identifiers for the terminal device of the user. As described in relation to above embodiments, said SIM card may be (initially) provisioned for use in a public mobile network. Said public mobile network may specifically act as the home mobile network of the user. The caching server may carry out the processes discussed in relation to block 502 to 505 for each of said plurality of users separately based on respective one or more identifiers received in the first request.

In the following, the authentication using an authentication vector is discussed in brief. The authentication using the authentication vector is based on idea that both the terminal device and the mobile network have access to the same subscriber authentication key $K_{ASME}$. This same key is stored both in a memory of a (U)SIM card of the terminal device and in the HSS/AuC of the mobile network.

The use of the approach discussed in relation to FIG. 5 may require an agreement with a commercial operator to share the authentication data (e.g., authentication vectors). However, it should be noted that this agreement is very different from a roaming agreement as:

There is no routing of data to home network (Home Routing) (S8) interface.
No call delivery from the home network.
No S9 interface.
No billing exchange or agreement.
Not an open service to all commercial operator subscribers.
No conventional roaming agreement is needed for implementing the embodiments.

Figure 6:
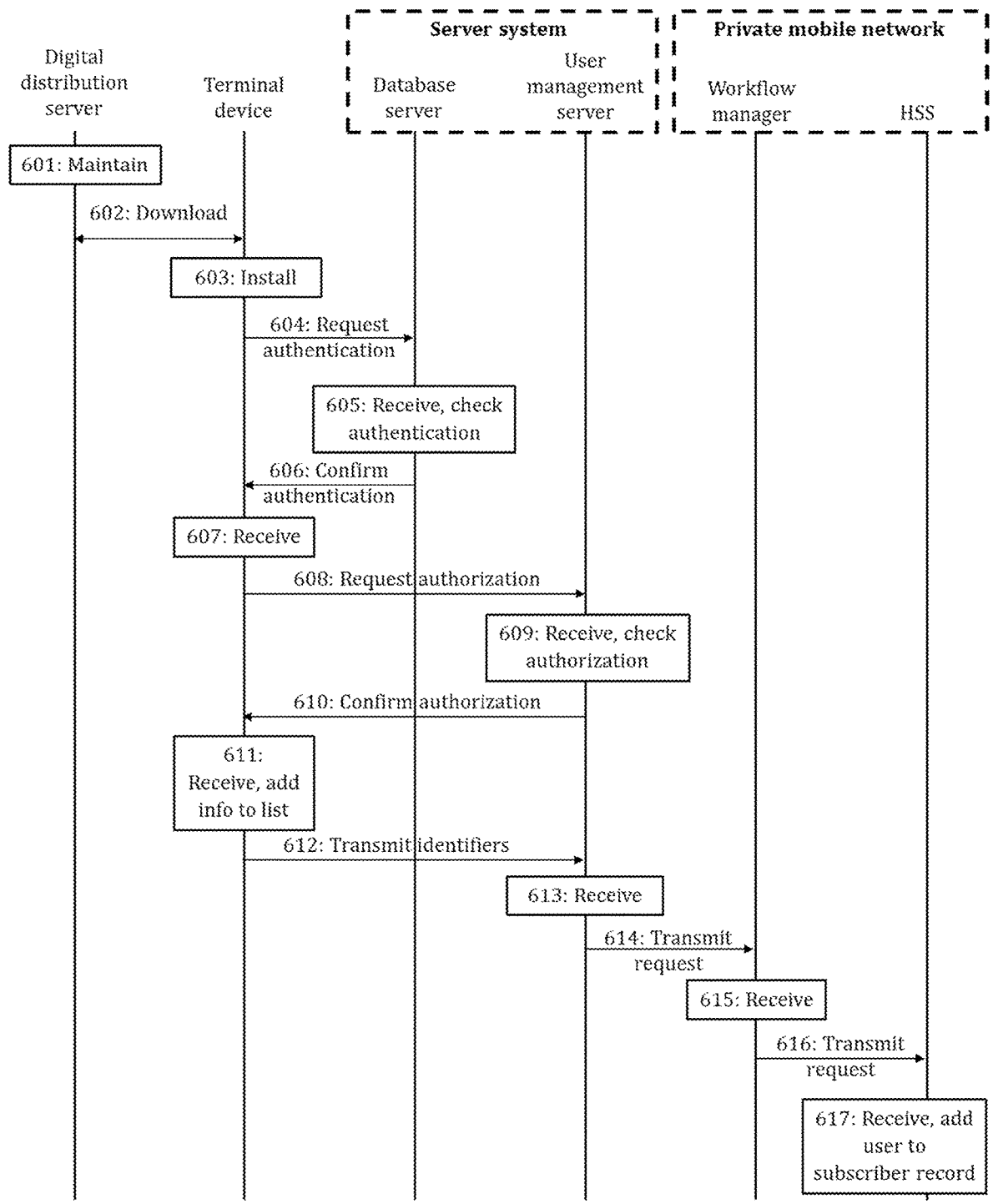

FIG. 6 illustrates signaling according to embodiments for enabling a terminal device to access to a private mobile network. Specifically, FIG. 6 illustrates signaling between a digital distribution server, a terminal device, a server system comprising a database server and a user management server and a private mobile network comprising a workflow management unit and a home subscriber server. The owner of the private mobile network may be, for example, a company, a governmental agency or an organization. The entities illustrated in FIG. 6 may correspond to corresponding entities discussed in relation to FIG. 2. Unless explicitly stated otherwise, any features described in relation to FIGS. 3 to 5 may apply equally also to the processes of FIG. 6.

Initially in FIG. 6, a digital distribution server maintains, in block 601, an installation package of an application in a memory. The digital distribution server may allow users of terminal device to browse and download application to their terminal devices (using their terminal devices). Accordingly, the terminal device downloads, in messages 602, the installation package of the application from the digital distribution server. Subsequently, the terminal device installs, in block 603, the application using the downloaded installation package. The following steps carried out by the terminal device may be carried out by running said installed application.

First, the terminal device transmits, in message 604, a request for authorizing a user of the terminal device for accessing a private mobile network (via a wireless communications network) to a database server of a server system. Said request may comprise at least identification information identifying the user of the terminal device (e.g., an identifier of the user or an e-mail of the user).

In response to receiving, in block 605, the request for authenticating the user (via the wireless communications network) from the terminal device, the database server determines, in block 605, whether the user is an authentic user in view of the private mobile network by comparing the identification information of the user against identification information of known users maintained in a database of the database server. Said known users may comprise both authorized users as well as non-authorized (or not-yet-authorized) users. The database of the database server may correspond to a company (or corporate) active directory comprising information on people currently employed by the company, a governmental/state/municipal agency active directory comprising information on people currently employed by said agency or an organization active directory comprising information on current members of the organization.

In the example of FIG. 6, it is assumed that the authentication is successful. Therefore, the database server of the server system transmits, in message 606, a confirmation message confirming an authenticity of the user (via the wireless communications network) to the terminal device. If the authentication fails, the database server may, instead, transmit a rejection message or it may not transmit any message. The confirmation and rejection messages may be equally called acknowledgment and negative acknowledgment messages, respectively.

In response to receiving the confirmation message in block 607, the terminal device may proceed to the next step in the authorization process, that is, the terminal device transmits, in message 608, a second request for authorizing a user of the terminal device for accessing a private mobile network (via a wireless communications network) to a user management server of the server system. The second request may comprise, similar to the first request, at least identification information identifying the user of the terminal device. Same or different identification information may be included in the first and second requests. In some embodiments, a (subscriber) authentication key may be provided in message 606 and subsequently included, in addition to the identification information, in the second request 608 and subsequently used for the authorization of the user.

In response to receiving the second request in block 609, the user management server determines, in block 609, whether the user is authorized for accessing the private mobile network by comparing the identification information of the user (comprised in the second request) against identification information of authorized users maintained in a database of the user management server. Specifically, the database of the user management server may maintain identification information on employees of a company or a governmental agency or members of an organization for whom a permission for accessing the private mobile network has been granted.

In the example of FIG. 6, it is assumed that also the authorization is successful. Therefore, the database server of the server system transmits, in message 610, a confirmation message confirming the authorization of the user in regards to accessing the private mobile network (via the wireless communications network) to the terminal device.

In some embodiments, the authorization check described in relation to 604 to 607 may be omitted and thus only the authorization check described in relation to 608 to 611 may be carried out.

The actions pertaining to elements 611, 612 may correspond to actions described in relation to blocks 302 to 304 of FIG. 3. In short, in response to receiving the confirmation message from the user management server of the server system in block 611, the terminal device adds, in block 611, to a list of allowed mobile networks in at least one memory (e.g., in a memory of the (U)SIM), an identifier of the private mobile network and transmits, in message 612, one or more identifiers for a SIM card of the user comprised in the terminal device and one or more identifiers for the terminal device (via the wireless communications network) to the server system.

In response to receiving the identifiers (e.g., MSISDN, ICCID, IMSI and/or IMEI) in block 613, the user management server of the server system transmits, in message 614, a request for provisioning the user in the HSS to the workflow management unit of the private mobile network. This request may comprise at least the identifiers received from the terminal device. In response to receiving the request in block 615, the workflow management unit of the private mobile network transmits (or forwards), in message 616, another request for provisioning the user in the HSS to the HSS. In response to receiving the request in block 617, the HSS adds, in block 617, a subscriber record corresponding to the user to a list of subscribers maintained in a memory of the HSS. Consequently, all authorized home mobile networks (i.e., home PLMNs) of the terminal device shall be treated as a home mobile networks (i.e., home PLMNs) within the private mobile network. Thus, there is no need to have a roaming agreement between the owner of the private mobile network and with commercial operators (i.e., the owner of the commercial mobile network).

Figure 7:
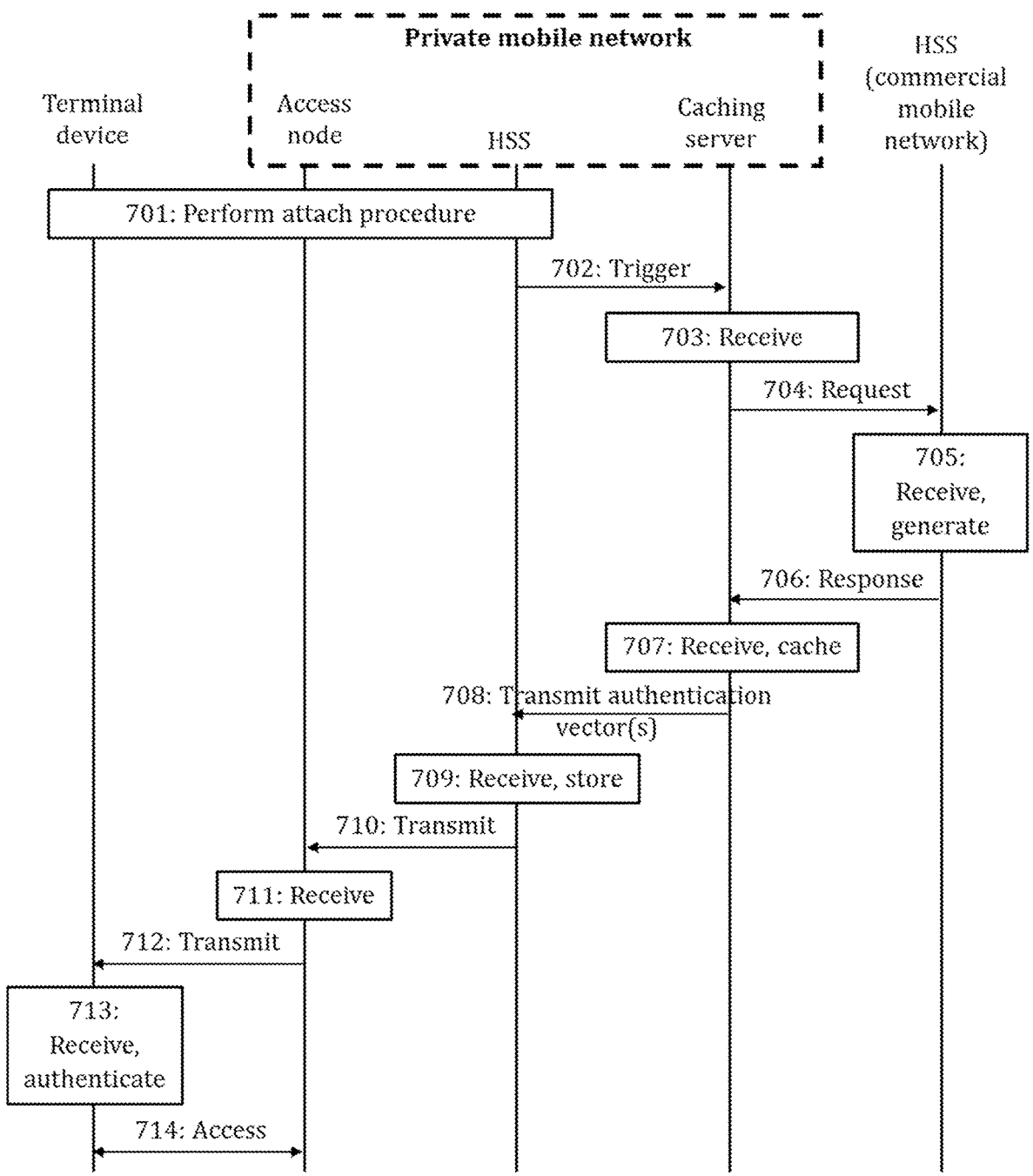

FIG. 7 illustrates signaling according to embodiments for acquiring authentication data so as to enable a terminal device to access a private mobile network. Specifically, FIG. 7 illustrates signaling between a terminal device, a private mobile network comprising at least one or more access nodes (one is explicitly shown), a HSS and a caching server and a home subscriber server of a commercial mobile network. The owner of the private mobile network may be, for example, a company, a governmental agency or an organization. The entities illustrated in FIG. 7 may correspond to corresponding entities discussed in relation to FIG. 2. Unless explicitly stated otherwise, any features described in relation to FIGS. 3 to 5 may apply equally also to the processes of FIG. 7.

In FIG. 7, it is assumed that initially a user has been authorized for accessing the private mobile network and a subscriber record for a user has already been added to the HSS of the private mobile network. To this end, it may be assumed, for example, that the processes of FIG. 6 have been carried out before the performing of the processes of FIG. 7.

Referring to FIG. 7, an attach procedure (or specifically an initial attach procedure) is, first, performed, in block 701, between the terminal device and a core network of the private mobile network so as to register the terminal device with the private mobile network. This registration is known as network attachment. The attach procedure may be any conventional attach procedure such as an LTE attach procedure. The attach procedure may involve one or more core network elements not shown in FIG. 7 such as a mobility management entity (MME), a serving gateway (SGW), a packet data network gateway (PGW) and/or a policy and charging rules function (PCRF).

The attach procedure in block 701 may be initiated by the terminal device transmitting an attach request to an access node of a private mobile network. The transmitting in message 701 may be carried out specifically based on a list of allowed mobile networks (e.g., the EFPLMNwACT list) maintained in at least one memory of the terminal device (or specifically of the SIM card therein) and comprising an identifier of the private mobile network. The attach request may comprise one or more identifiers for the SIM card of the user and/or the terminal device of the user. The information comprised in the attach request (and/or information provided thereafter by the terminal device) may be checked against information maintained in the HSS during the attach procedure. The attach procedure may establish a default bearer (or a default Evolved Packet System (EPS) bearer) for the terminal device. Attach procedure may also trigger one or multiple Dedicated Bearer Establishment procedures to establish dedicated (EPS) bearer for the terminal device.

The registering of the terminal device in the private mobile network for the first time in block 701 causes the HSS to transmit, in message 702, a first request for acquiring authentication data for the user to the caching server. Here, the authentication data and in the following the authentication data is assumed to correspond to a set of one or more authentication vectors. Each authentication vector may comprise values of RAND, XRES, $AUTN_{HSS}$ and $K_{ASME}$.

In response to receiving the first request in block 703, the caching server transmits, in message 704, a second request for the authentication vectors of the user to a home subscriber server of a (commercial) home mobile network of the user (i.e., a home public mobile network of the user). The second request may be called an authentication data request. The first and second request may comprise at least one or more identifiers for the SIM of the user (or specifically at least an IMSI).

In response to receiving the second request from the caching server in block 705, the HSS of the home mobile network generates, in block 705, the set of one or more authentication vectors for the user. Each authentication vector may be defined as described in relation to FIG. 5, that is, it may comprise a random number (RAND) acting as a user authentication challenge, a network authentication token ($AUTN_{HSS}$), a subscriber authentication key ($K_{ASME}$) and an expected response (XRES).

According to an embodiment, the HSS of the home mobile network generates, in block 705, each authentication vector in the set of one or more authentication vectors as follows. It is assumed, here, that the second request (and the first request) comprises at least an IMSI of the SIM card of the user. Based on said IMSI comprised in the second request, the HSS, first, retrieves a master key K and a sequence number SQN from a memory of the HSS. The HSS increments the SQN by one and generates a RAND. Based on the values of $K_{ASME}$, SQN and RAND, the HSS generates, using one or more cryptographic functions, a preliminary authentication vector defined as comprising XRES, $AUTN_{HSS}$, RAND, an integrity key IK and a ciphering key CK. Then, the HSS generates the subscriber authentication key $K_{ASME}$ based on the IMSI, SQN, RAND, CK, IK and optionally one or more other parameters such as a serving network identifier (SN ID). This process may be repeated multiple times so as to generate multiple authentication vectors.

After generating the set of one or more authentication vectors in block 705, the HSS of the home mobile network transmits, in message 706, a response comprising the set of one or more authentication vectors back to the caching server of the private mobile network. The response may be called an authentication data response.

In response to receiving the response comprising the set of one or more authentication vectors from the home subscriber server of the home mobile network in block 707, the caching server caches, in block 707, the set of authentication vectors (in a dedicated authentication vector array) and transmits, in message 708, at least one of the one or more authentication vectors in the set to the home subscriber server of the private mobile network for providing access for the user to the private mobile network.

In response to receiving the at least one authentication vector in block 709, the HSS forwards, in message 710, at least RAND and $AUTN_{HSS}$ of one of the at least one authentication vector to the access node. The HSS also stores, in block 710, the received at least one authentication vector to its memory. Subsequently, upon receiving the values of RAND and $AUTN_{HSS}$ from the HSS in block 711, the access node forwards, in message 712, them to the terminal device. The terminal device receives the values of RAND and $AUTN_{HSS}$ from the access node in block 713. The terminal device may optionally store the received values to a memory of the terminal device (or a memory of the (U)SIM card comprised in the terminal device). Using the values of RAND and $AUTN_{HSS}$, the terminal device confirms, in block 713, the authenticity of the private mobile network (i.e., the authenticity of the value of $AUTN_{HSS}$). Thereafter, the terminal device accesses, in messages 714, the private mobile network. The accessing in messages 714 may also involve, initially, authenticating the terminal device (or specifically the SIM card comprised therein) in the private mobile network based on a response to message 712 transmitted by the terminal device in messages 714. In this way, mutual authentication may be carried out between the terminal device and the private mobile network.

Specifically, the mutual authentication may be carried out, in block 716 and messages 714, as follows. Based on a master key K and a sequential number SQN maintained in a memory of the terminal device (specifically of the (U)SIM), the terminal device generates its own version of $AUTN_{HSS}$. Then, the terminal device compares the two values for $AUTN_{HSS}$. If they match each other, the private mobile network is deemed authenticated from the point of view of the terminal device (or specifically of the (U)SIM of the terminal device). Then, the terminal device calculates a response (RES) using one or more cryptographic functions with the master key K and the received random number RAND as inputs. The RES is transmitted by the terminal device via the access node to core network of the private mobile network, where it is authenticated by comparing it against the XRES. This completes the mutual authentication.

In some embodiments, the caching server may request additional authentication vectors from the HSS of the home mobile network of the user in response to detecting that the set of one or more authentication vectors has been exhausted. This process may correspond to repeating the actions pertaining to elements 704 to 708.

The blocks, related functions, and information exchanges described above by means of FIGS. 3 to 7 are in no absolute chronological order, and some of them may be performed simultaneously or in an order differing from the given one. Other functions can also be executed between them or within them, and other information may be sent and/or received, and/or other mapping rules applied. Some of the blocks or part of the blocks or one or more pieces of information can also be left out or replaced by a corresponding block or part of the block or one or more pieces of information.

Figure 8:
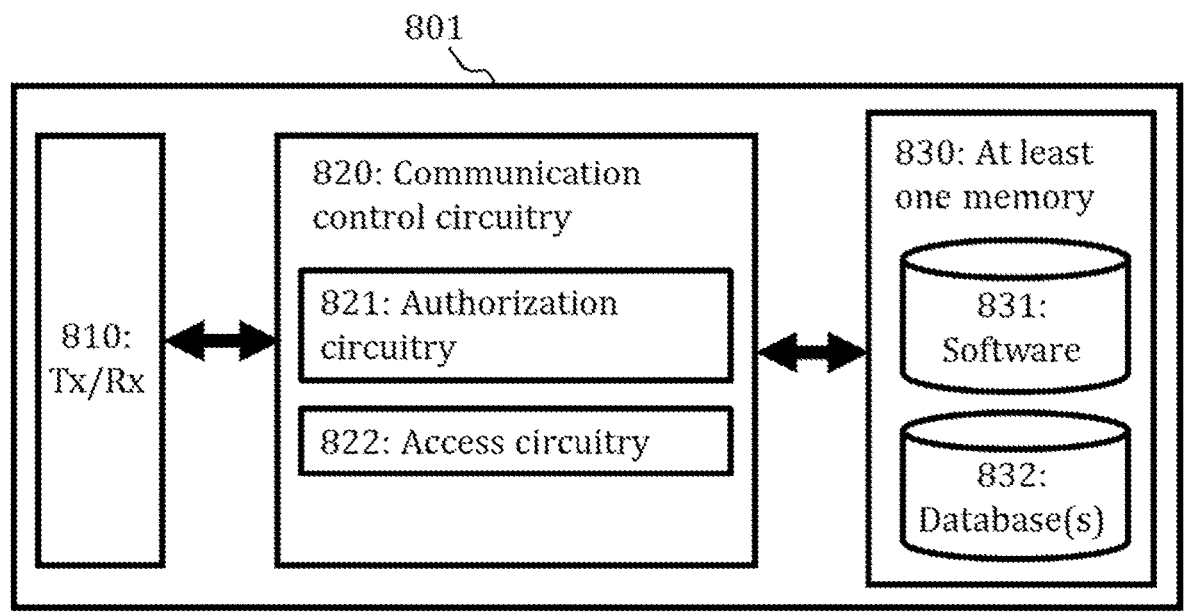
FIGS. 8 to 10 illustrate apparatuses according to embodiments.

FIG. 8 provides a terminal device 801 according to some embodiments. FIG. 8 may illustrate a terminal device configured to carry out at least the functions described above in connection with enabling access to a private mobile network. The terminal device 801 may correspond specifically to a terminal device with at least one SIM card. The terminal device may correspond to any of terminal devices 100, 102 of FIG. 1 or a terminal device 202 of FIG. 2. The terminal device 801 may comprise one or more communication control circuitry 820, such as at least one processor, and at least one memory 830, including one or more algorithms 831, such as a computer program code (software) wherein the at least one memory and the computer program code (software) are configured, with the at least one processor, to cause, respectively, the terminal device to carry out any one of the exemplified functionalities of the terminal device described above.

Referring to FIG. 8, the communication control circuitry 820 of the terminal device comprises at least authorization circuitry 821 and access circuitry 822. The authorization circuitry 821 may be configured to carry out authentication and/or authorization functionalities in communication with a server system according to embodiments and, to this end, to carry out at least some of the functionalities described above by means of any of blocks 301 to 304 of FIG. 3 and elements 602, 603, 604, 607, 608, 611, 612 of FIG. 6 using one or more individual circuitries. The access circuitry 822 may be configured to carry out any functionalities carried out following the authentication and/or authorization functionalities so as connect to a (private) mobile network. To this end, the access circuitry 822 may be configured to carry out at least some of the functionalities described above by means of any of blocks 305 of FIG. 3 and elements 701, 711, 712, 713, 714 of FIG. 7 using one or more individual circuitries. The communication control circuitry 820 may comprise circuitry of the terminal device itself as well as circuitry of at least one SIM card inserted into the terminal device.

The at least one memory 830 may comprise at least one database 832 which may comprise, for example, one or more identifiers for the at least one SIM card, one or more identifiers for the terminal device and one or more identifiers for one or more private and/or commercial mobile network. The at least one memory 830 may comprise at least one memory of the terminal device itself and at least one memory of the at least one SIM card inserted into the terminal device. Each memory 830 may comprise software and at last one database. The memory 830 may also comprise other databases which may not be related to the functionalities of the terminal device according to any of presented embodiments. The at least one memory 830 may be implemented using any suitable data storage technology, such as semiconductor based memory devices, flash memory, magnetic memory devices and systems, optical memory devices and systems, fixed memory and removable memory.

Referring to FIG. 8, the terminal device may further comprise different interfaces 810 such as one or more communication interfaces (TX/RX) comprising hardware and/or software for realizing communication connectivity over one or more communications network according to one or more communication protocols. Specifically, the one or more communication interfaces 810 may provide the terminal device with communication capabilities to communicate in one or more mobile network and enable communication with a digital distribution server, one or more server systems of private mobile networks, one or more access nodes, one or more terminal devices (possibly via said plurality of access nodes) and/or one or more other network nodes or elements. The one or more communication interfaces 810 may comprise standard well-known components such as an amplifier, filter, frequency-converter, analog-to-digital converts, (de)modulator, and encoder/decoder circuitries, controlled by the corresponding controlling units, and one or more antennas.

Figure 9:
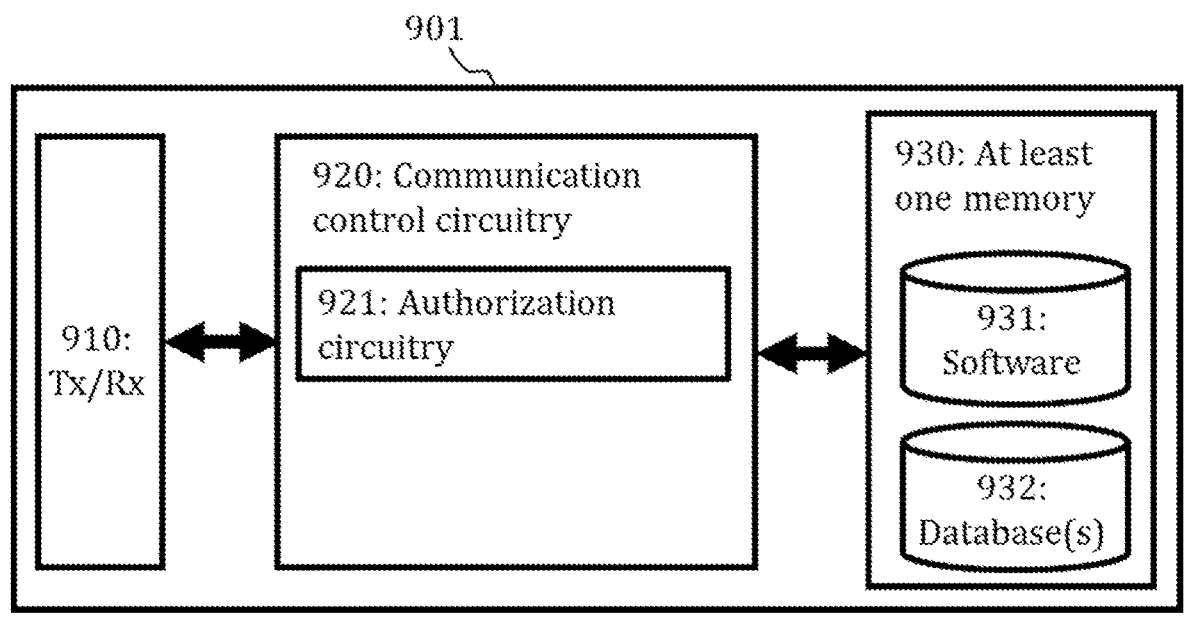

FIG. 9 provides a server system 901 according to some embodiments. FIG. 9 may illustrate a server system configured to carry out at least the functions described above in connection with enabling access for a terminal device to a private mobile network managed by the server system. The server system 901 may comprise one or more individual servers. Specifically, the server system 901 may comprise a database server and a user management server as described in relation to above embodiments. The server system may correspond to a server system 204 of FIG. 2. The server system 901 may comprise one or more communication control circuitry 920, such as at least one processor, and at least one memory 930, including one or more algorithms 931, such as a computer program code (software) wherein the at least one memory and the computer program code (software) are configured, with the at least one processor, to cause, respectively, the server system to carry out any one of the exemplified functionalities of the server system described above.

Referring to FIG. 9, the communication control circuitry 920 of the server system comprises at least authorization circuitry 921. The authorization circuitry 921 may be configured to carry out authentication and/or authorization functionalities of a user in communication with a terminal device of said user according to embodiments and, to this end, to carry out at least some of the functionalities described above by means of any of blocks 401 to 406 of FIG. 4 and elements 605, 606, 609, 610, 613 of FIG. 6 using one or more individual circuitries.

The at least one memory 930 may comprise at least one database 932 which may comprise, for example, identification information of authorized and/or non-authorized users of the private mobile network. Said at least one database 932 may comprise a database of a database server and a database of a user management server as described in relation to above embodiments. The at least one memory 930 may comprise a memory of the database server itself and memory of the user management server. Each memory 930 may comprise software and at last one database. The at least one memory 930 may also comprise other databases which may not be related to the functionalities of the server system according to any of presented embodiments. The at least one memory 930 may be implemented using any suitable data storage technology, such as semiconductor based memory devices, flash memory, magnetic memory devices and systems, optical memory devices and systems, fixed memory and removable memory.

Referring to FIG. 9, the server system may further comprise different interfaces 910 such as one or more communication interfaces (TX/RX) comprising hardware and/or software for realizing communication connectivity over one or more communications network according to one or more communication protocols, e.g., according to Internet protocol as an APN/PDN (access point name/packet data network) over LTE. Specifically, the one or more communication interfaces 910 may provide the server system with communication capabilities to enable communication with a private mobile network (or specifically one or more core network element such as a workflow management unit therein) and/or one or more terminal devices. The one or more communication interfaces 910 may comprise standard well-known component(s) such as an amplifier, filter, frequency-converter, analog-to-digital converts, (de)modulator, and encoder/decoder circuitries, controlled by the corresponding controlling units, and/or one or more antennas.

Figure 10:
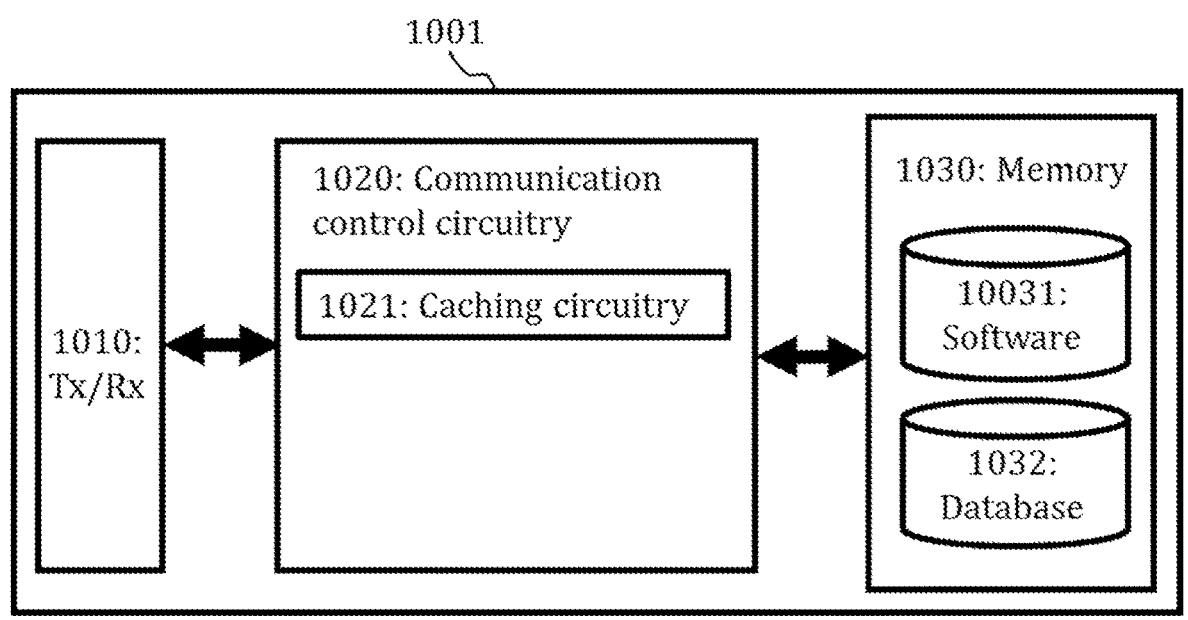

FIG. 10 provides a caching server 1001 according to some embodiments. FIG. 10 may illustrate a caching server configured to carry out at least the functions described above in connection with acquiring authentication data for a user attempting to access a private mobile network and caching said authentication data. The caching server 1001 may be comprise in a core network of a private mobile network. The caching server may correspond to a caching server 213 of FIG. 2. The caching server 1001 may comprise one or more communication control circuitry 1020, such as at least one processor, and at least one memory 1030, including one or more algorithms 1031, such as a computer program code (software) wherein the at least one memory and the computer program code (software) are configured, with the at least one processor, to cause, respectively, the caching server to carry out any one of the exemplified functionalities of the caching server described above.

Referring to FIG. 10, the communication control circuitry 1020 of the caching server comprises at least caching circuitry 1021. The caching circuitry 1021 may be configured to carry out authentication data acquiring and caching functionalities of a caching server according to embodiments and, to this end, to carry out at least some of the functionalities described above by means of any of blocks 501 to 505 of FIG. 5 and elements 703, 704, 707, 708 of FIG. 7 using one or more individual circuitries.

The at least one memory 1030 may comprise at least one database 1032 which may comprise, for example, at least one set of one or more authentication vectors for at least one user. The at least one memory 1030 may also comprise other databases which may not be related to the functionalities of the caching server according to any of presented embodiments. The at least one memory 1030 may be implemented using any suitable data storage technology, such as semiconductor based memory devices, flash memory, magnetic memory devices and systems, optical memory devices and systems, fixed memory and removable memory.

Referring to FIG. 10, the caching server may further comprise different interfaces 1010 such as one or more communication interfaces (TX/RX) comprising hardware and/or software for realizing communication connectivity over one or more communications network according to one or more communication protocols such as Internet and/or Mobile Application Part (MAP) protocols. Specifically, the one or more communication interfaces 1010 may provide the caching server with communication capabilities to enable communication at least with a HSS of the private mobile network in which the caching server is located and/or at least one HSS in at least one (commercial) mobile network. In some embodiments, the one or more communication interfaces 1010 may comprise standard well-known components such as an amplifier, filter, frequency-converter, analog-to-digital converts, (de)modulator, and encoder/decoder circuitries, controlled by the corresponding controlling units, and/or one or more antennas.

As used in this application, the term 'circuitry' may refer to one or more or all of the following: (a) hardware-only circuit implementations, such as implementations in only analog and/or digital circuitry, and (b) combinations of hardware circuits and software (and/or firmware), such as (as applicable): (i) a combination of analog and/or digital hardware circuit(s) with software/firmware and (ii) any portions of hardware processor(s) with software, including digital signal processor(s), software, and memory(ies) that work together to cause an apparatus, such as a terminal device or an access node, to perform various functions, and (c) hardware circuit(s) and processor(s), such as a microprocessor(s) or a portion of a microprocessor(s), that requires software (e.g. firmware) for operation, but the software may not be present when it is not needed for operation. This definition of 'circuitry' applies to all uses of this term in this application, including any claims. As a further example, as used in this application, the term 'circuitry' also covers an implementation of merely a hardware circuit or processor (or multiple processors) or a portion of a hardware circuit or processor and its (or their) accompanying software and/or firmware. The term 'circuitry' also covers, for example and if applicable to the particular claim element, a baseband integrated circuit for an access node or a terminal device or other computing or network device.

In embodiments, the at least one processor, the memory, and the computer program code form processing means or comprises one or more computer program code portions for carrying out one or more operations according to any one of the embodiments of FIGS. 3 to 7 or operations thereof.

In an embodiment, at least some of the processes described in connection with FIGS. 3 to 7 may be carried out by an apparatus comprising corresponding means for carrying out at least some of the described processes. Some example means for carrying out the processes may include at least one of the following: detector, processor (including dual-core and multiple-core processors), digital signal processor, controller, receiver, transmitter, encoder, decoder, memory, RAM, ROM, software, firmware, display, user interface, display circuitry, user interface circuitry, user interface software, display software, circuit, antenna, antenna circuitry, and circuitry. In an embodiment, the at least one processor, the memory, and the computer program code form processing means or comprises one or more computer program code portions for carrying out one or more operations according to any one of the embodiments of FIGS. 3 to 7 or operations thereof.

According to an aspect, there is provided a terminal device comprising means for performing:
transmitting a request for authorizing a user of the terminal device for accessing a private mobile network to a server system managing the private mobile network, wherein the request comprises at least identification information identifying the user of the terminal device;
in response to receiving, from the server system, a confirmation message confirming an authorization of the user for accessing the private mobile network,
adding, to a list of allowed mobile networks in at least one memory, an identifier of the private mobile network and transmitting, to the server system, one or more identifiers for a subscriber identity module, SIM, card of the user and one or more identifiers for the terminal device for provisioning the user in the private mobile network using transmitted identifiers, said SIM card being comprised in the terminal device and being provisioned for use in a public mobile network; and
accessing the private mobile network using at least the identifier of the private mobile network via an access node of the private mobile network.

According to another aspect, there is provided a server system for managing access to a private mobile network, the server system comprising means for performing:
receiving a request for authorizing a user of a terminal device for accessing the private mobile network from the terminal device, wherein the request comprises at least identification information identifying the user of the terminal device;
determining, in response to the receiving, whether the user is authorized for accessing the private mobile network by comparing the identification information of the user against identification information of users authorized for accessing the private mobile network maintained in a first database of the server system;
transmitting, in response to an authorization based on the first database being successful, a confirmation message confirming an authorization of the user for accessing the private mobile network to the terminal device; and
in response to receiving one or more identifiers for a subscriber identity module, SIM, card of the user and one or more identifiers for the terminal device from the terminal device, initiating a network provisioning workflow for provisioning the user in the private mobile network using received identifiers, said SIM card being comprised in the terminal device and being provisioned for use in a public mobile network.

According to yet another aspect, there is provided a caching server for a private mobile network, the caching server comprising means for performing:
receiving, from a home subscriber server, HSS, of the private mobile network, a first request for acquiring authentication data for a user, wherein the first request comprises one or more identifiers for a subscriber identity module, SIM, card of the user, said SIM card being provisioned for use in a public mobile network acting as a home mobile network of the user;
transmitting, in response to the receiving, a second request for the authentication data to a home subscriber server of the home mobile network of the user, wherein the second request comprises at least said one or more identifiers for the SIM card of the user; and
in response to receiving a response comprising the authentication data from the home subscriber server of the home mobile network, caching the authentication data and transmitting at least some of the authentication data to the home subscriber server of the private mobile network for providing access for the user to the private mobile network.

The techniques and methods described herein may be implemented by various means. For example, these techniques may be implemented in hardware (one or more devices), firmware (one or more devices), software (one or more modules), or combinations thereof. For a hardware implementation, the apparatus(es) of embodiments may be implemented within one or more application-specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. For firmware or software, the implementation can be carried out through modules of at least one chipset (procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the systems described herein may be rearranged and/or complemented by additional components in order to facilitate the achievements of the various aspects, etc., described with regard thereto, and they are not limited to the precise configurations set forth in the given figures, as will be appreciated by one skilled in the art.

Embodiments as described may also be carried out in the form of a computer process defined by a computer program or portions thereof. Embodiments of the methods described in connection with FIGS. 3 to 7 may be carried out by executing at least one portion of a computer program comprising corresponding instructions. The computer program may be provided as a computer readable medium comprising program instructions stored thereon or as a non-transitory computer readable medium comprising program instructions stored thereon. The computer program may be in source code form, object code form, or in some intermediate form, and it may be stored in some sort of carrier, which may be any entity or device capable of carrying the program. For example, the computer program may be stored on a computer program distribution medium readable by a computer or a processor. The computer program medium may be, for example but not limited to, a record medium, computer memory, read-only memory, electrical carrier signal, telecommunications signal, and software distribution package, for example. The computer program medium may be a non-transitory medium. Coding of software for carrying out the embodiments as shown and described is well within the scope of a person of ordinary skill in the art.

Even though the invention has been described above with reference to examples according to the accompanying drawings, it is clear that the invention is not restricted thereto but can be modified in several ways within the scope of the appended claims. Therefore, all words and expressions should be interpreted broadly and they are intended to illustrate, not to restrict, the embodiment. It will be obvious to a person skilled in the art that, as technology advances, the inventive concept can be implemented in various ways. Further, it is clear to a person skilled in the art that the described embodiments may, but are not required to, be combined with other embodiments in various ways.

The invention claimed is:

1. A terminal device comprising:
at least one processor, and
at least one memory for storing instructions to be executed by the at least one processor, wherein the at least one memory and the instructions are configured to, with the at least one processor, cause the terminal device at least to perform:
transmitting a request for authorizing a user of the terminal device for accessing a private mobile network to a server system managing the private mobile network, wherein the request comprises at least identification information identifying the user of the terminal device;
in response to receiving, from the server system, a confirmation message confirming an authorization of the user for accessing the private mobile network,
adding, to a list of allowed mobile networks in said at least one memory, an identifier of the private mobile network and transmitting, to the server system, one or more identifiers for a subscriber identity module, SIM, card of the user and one or more identifiers for the terminal device for provisioning the user in the private mobile network using transmitted identifiers, said SIM card being comprised in the terminal device and being provisioned for use in a public mobile network; and
accessing the private mobile network using at least the identifier of the private mobile network via an access node of the private mobile network.

2. The terminal device of claim 1, wherein the at least one memory and the instructions are configured to, with the at least one processor, cause the terminal device to perform:
transmitting a request for authenticating the user to the server system, wherein the request for the authenticating comprises at least identification information identifying the user of the terminal device; and
performing the transmitting of the request for authorizing the user in response to receiving a confirmation message confirming an authenticity of the user from the server system.

3. The terminal device of claim 1, wherein the one or more identifiers for the terminal device comprise an international mobile equipment identity, IMEI or a permanent equipment identifier, PEI, or the one or more identifiers for a SIM card of the user comprise at least one of a mobile station international integrated services digital network number, MSISDN, an integrated circuit card identifier, ICCID, an international mobile subscriber identity, IMSI, and a subscription permanent identifier, SUPI.

4. The terminal device according to claim 1, wherein the adding of the identifier of the private mobile network to the list of allowed mobile networks in said at least one memory comprises:
updating a user controlled public land mobile network selector with access technology, EFPLMNwACT, list, maintained in a memory of the SIM card of the terminal device, with an identifier of the private mobile network.

5. A server system for managing access to a private mobile network, the server system comprising:
at least one processor, and
at least one memory for storing instructions to be executed by the at least one processor, wherein the at least one memory and the instructions are configured to, with the at least one processor, cause the server system at least to perform:
receiving a request for authorizing a user of a terminal device for accessing the private mobile network from the terminal device, wherein the request comprises at least identification information identifying the user of the terminal device;
determining, in response to the receiving, whether the user is authorized for accessing the private mobile network by comparing the identification information of the user against identification information of users authorized for accessing the private mobile network maintained in a first database of the server system;
transmitting, in response to an authorization based on the first database being successful, a confirmation message confirming an authorization of the user for accessing the private mobile network to the terminal device; and
in response to receiving one or more identifiers for a subscriber identity module, SIM, card of the user and one or more identifiers for the terminal device from the terminal device, initiating a network provisioning workflow for provisioning the user in the private mobile network using received identifiers, said SIM card being comprised in the terminal device and being provisioned for use in a public mobile network.

6. The server system of claim 5, wherein the at least one memory and the instructions are configured to, with the at least one processor, cause the server system at least to perform:
receiving a request for authenticating the user to the server system, wherein the request for the authenticating comprises at least identification information identifying the user of the terminal device;
determining, in response to the receiving of the request for the authenticating, whether the user is an authentic user by comparing the identification information of the user against identification information of known users maintained in a second database of the server system or the first database; and
transmitting a confirmation message confirming an authenticity of the user to the terminal device.

7. The server system of claim 6, wherein the server system comprises at least a user management server for handling the request for the authorizing using the first database and a database server for handling the request for the authenticating using the second database.

8. The server system according to claim 5, wherein the initiating of the network provisioning workflow for provisioning the user in the private mobile network based on at least one received identifier comprises:
transmitting at least the received identifiers to a core network element of the private mobile network so as to trigger a process of adding a subscriber record corresponding to the user to a home subscriber server, HSS, of the private mobile network.

9. A caching server for a private mobile network, the caching server comprising:
at least one processor, and
at least one memory for storing instructions to be executed by the at least one processor, wherein the at least one memory and the instructions are configured to, with the at least one processor, cause the caching server at least to perform:
receiving, from a home subscriber server, HSS, of the private mobile network, a first request for acquiring authentication data for a user, wherein the first request comprises one or more identifiers for a subscriber identity module, SIM, card of the user, said SIM card being provisioned for use in a public mobile network acting as a home mobile network of the user;
transmitting, in response to the receiving, a second request for the authentication data to a home subscriber server of the home mobile network of the user, wherein the second request comprises at least said one or more identifiers for the SIM card of the user; and
in response to receiving a response comprising the authentication data from the home subscriber server of the home mobile network, caching the authentication data for accessing by the home subscriber server of the private mobile network and transmitting at least some of the authentication data to the home subscriber server of the private mobile network for providing access for the user to the private mobile network.

10. The caching server of claim 9, wherein the authentication data comprises a set of one or more authentication vectors and the transmitting of said at least some of the authentication data comprises transmitting at least one authentication vector in the set of one or more authentication vectors.

11. The caching server of claim 10, wherein each authentication vector in the set of one or more authentication vectors comprises a random number, RAND, acting as a user authentication challenge, a network authentication token, $AUTN_{HSS}$, a subscriber authentication key, $K_{ASME}$, and an expected response, XRES.

12. A system for a private mobile network, the system comprising:
a caching server according to claim 9; and
a home subscriber server of the private mobile network, the home subscriber server comprising:
at least one processor, and
at least one memory for storing instructions to be executed by the at least one processor, wherein the at least one memory and the instructions are configured to, with the at least one processor, cause the home subscriber server at least to perform:
in response to receiving a request for provisioning the user in the home subscriber server of the private mobile network, adding a subscriber record corresponding to the user to a list of subscribers maintained in said at least one memory, wherein the request comprises one or more identifiers for a SIM card of the user or for the terminal device of the user and the subscriber record comprises said one or more identifiers; and
in response to a user of a terminal device registering to the private mobile network for a first time, transmitting a first request for acquiring authentication data for the user to the caching server.

13. A computer program embodied on a non-transitory computer-readable medium, said program comprising instructions which, when loaded into an apparatus, cause the apparatus to execute a method comprising:
transmitting a request for authorizing a user of a terminal device for accessing a private mobile network to a server system managing the private mobile network, wherein the request comprises at least identification information identifying the user of the terminal device;
in response to receiving a confirmation message confirming an authorization of the user for accessing the private mobile network from the server system,
adding, to a list of allowed mobile networks in at least one memory, an identifier of the private mobile network and
transmitting, to the server system, one or more identifiers for a subscriber identity module, SIM, card of the user and one or more identifiers for the terminal device for provisioning the user in the using transmitted identifiers, said SIM card being comprised in the terminal device and being provisioned for use in a public mobile network; and
accessing the private mobile network using at least the identifier of the private mobile network via an access node of the private mobile network.

14. A computer program embodied on a non-transitory computer-readable medium, said program comprising instructions which, when loaded into an apparatus, cause the apparatus to execute a method comprising:
receiving a request for authorizing a user of a terminal device for accessing a private mobile network from the terminal device, wherein the request comprises at least identification information identifying the user of the terminal device;
determining, in response to the receiving, whether the user is authorized for accessing the private mobile network by comparing the identification information of the user against identification information of users authorized for accessing the private mobile network maintained in a first database of the server system;

transmitting, in response to an authorization based on the first database being successful, a confirmation message confirming an authorization of the user for accessing the private mobile network to the terminal device; and in response to receiving one or more identifiers for a Subscriber Identity Module, SIM, card of the user and one or more identifiers for the terminal device from the terminal device, initiating a network provisioning workflow for provisioning the user in the private mobile network using received identifiers, said SIM card being comprised in the terminal device and being provisioned for use in a public mobile network.

15. A computer program embodied on a non-transitory computer-readable medium, said program comprising instructions which, when loaded into an apparatus, cause the apparatus to execute a method comprising:

receiving, from a home subscriber server of a private mobile network, a first request for acquiring authentication data for a user, wherein the first request comprises one or more identifiers for a Subscriber Identity Module, SIM, card of the user, said SIM card being provisioned for use in a public mobile network acting as a home mobile network of the user;

transmitting, in response to the receiving, a second request for the authentication data to a home subscriber server of the home mobile network of the user, wherein the second request comprises at least said one or more identifiers for the SIM card of the user; and in response to receiving a response comprising authentication data from the home subscriber server of the home mobile network, caching the authentication data for accessing by the home subscriber server of the private mobile network and transmitting at least some of the authentication data to the home subscriber server of the private mobile network for providing access for the user to the private mobile network.

16. A method comprising:

transmitting a request for authorizing a user of a terminal device for accessing a private mobile network to a server system managing the private mobile network, wherein the request comprises at least identification information identifying the user of the terminal device;

in response to receiving a confirmation message confirming an authorization of the user for accessing the private mobile network from the server system,
adding, to a list of allowed mobile networks in at least one memory, an identifier of the private mobile network and
transmitting, to the server system, one or more identifiers for a Subscriber Identity Module, SIM, card of the user and one or more identifiers for the terminal device for provisioning the user in the using transmitted identifiers, said SIM card being comprised in the terminal device and being provisioned for use in a public mobile network; and accessing the private mobile network using the identifier of the private mobile network via an access node of the private mobile network.

17. A method comprising:

receiving a request for authorizing a user of a terminal device for accessing a private mobile network from the terminal device, wherein the request comprises at least identification information identifying the user of the terminal device;

determining, in response to the receiving, whether the user is authorized for accessing the private mobile network by comparing the identification information of the user against identification information of users authorized for accessing the private mobile network maintained in a first database of a server system;

transmitting, in response to an authorization based on the first database being successful, a confirmation message confirming an authorization of the user for accessing the private mobile network to the terminal device; and in response to receiving one or more identifiers for a Subscriber Identity Module, SIM, card of the user and one or more identifiers for the terminal device from the terminal device, initiating a network provisioning workflow for provisioning the user in the private mobile network using received identifiers, said SIM card being comprised in the terminal device and being provisioned for use in a public mobile network.

18. A method comprising:

receiving, from a home subscriber server of a private mobile network, a first request for acquiring authentication data for a user, wherein the first request comprises one or more identifiers for a Subscriber Identity Module, SIM, card of the user, said SIM card being provisioned for use in a public mobile network acting as a home mobile network of the user;

transmitting, in response to the receiving, a second request for the authentication data to a home subscriber server of a home mobile network of the user, wherein the second request comprises at least said one or more identifiers for the SIM card of the user; and in response to receiving a response comprising authentication data from the home subscriber server of the home mobile network, caching the authentication data for accessing by the home subscriber server of the private mobile network and transmitting at least some of the authentication data to the home subscriber server of the private mobile network for providing access for the user to the private mobile network.

* * * * *